April 14, 1931.　　　J. H. JOHNSON　　　1,800,863
FOOD DISPLAY AND DISPENSING APPARATUS
Filed May 24, 1928　　　2 Sheets-Sheet 2

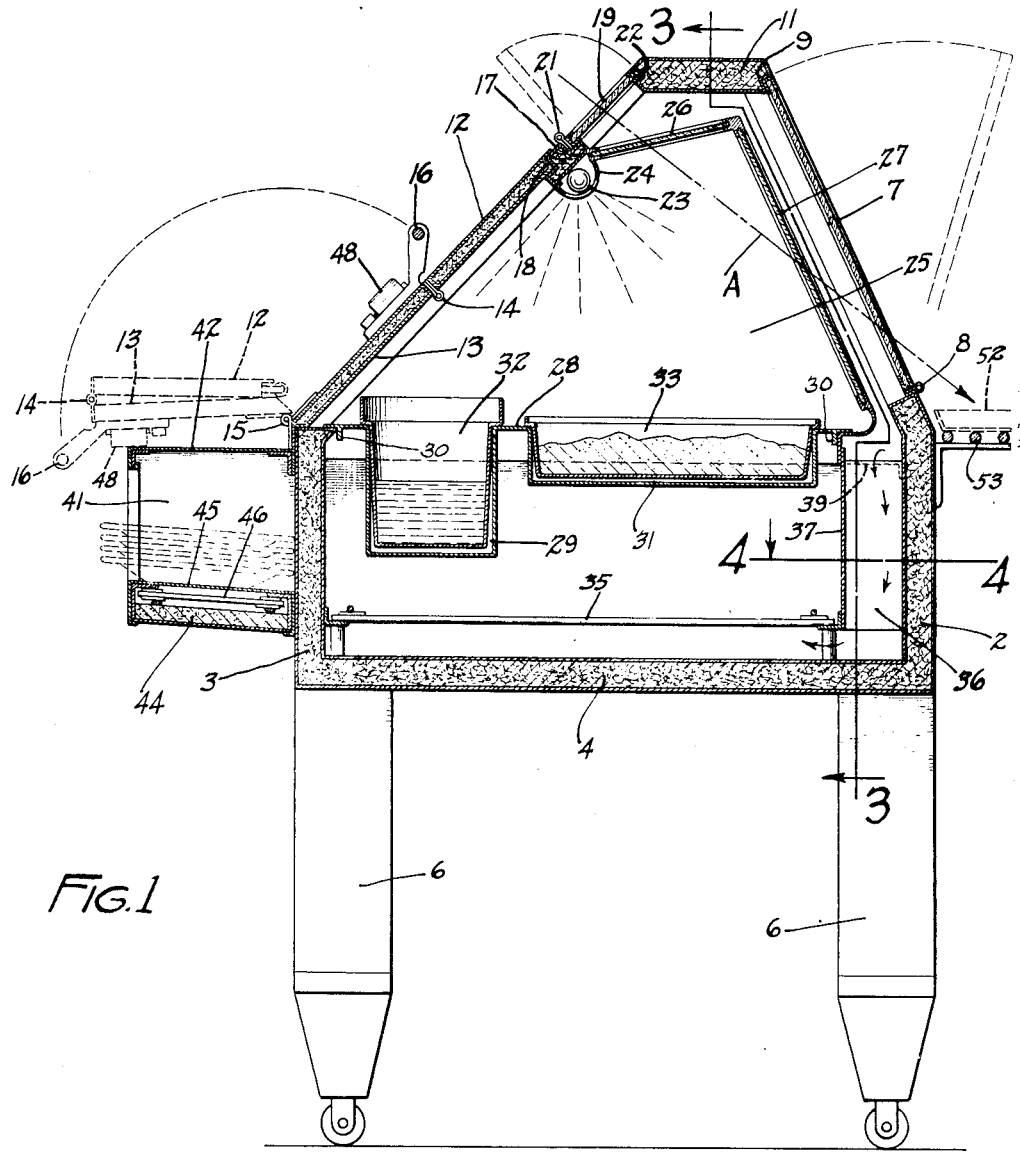
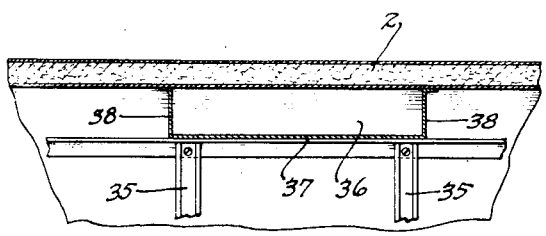

Inventor
JOHN H. JOHNSON
By
ATTORNEYS

Patented Apr. 14, 1931

1,800,863

UNITED STATES PATENT OFFICE

JOHN H. JOHNSON, OF CHULA VISTA, CALIFORNIA

FOOD DISPLAY AND DISPENSING APPARATUS

Application filed May 24, 1928. Serial No. 280,210.

This invention relates to an improved food display and dispensing apparatus particularly adapted for use in cafeterias, and similar places, for displaying food articles to be dispensed.

An object of the invention is to provide such an apparatus comprising a cabinet having insulating walls and a food display compartment therein, the walls of which are spaced from the walls of the cabinet and having air circulation passages therearound, and a heater being provided in the bottom of the cabinet for heating and circulating the air therein.

A further object of the invention is to provide a food display cabinet comprising an inner compartment adapted to contain the food to be displayed and dispensed, and portions of the front and rear walls of the cabinet being glazed and the corresponding walls of the inner compartment being similarly glazed to permit an attendant back of the cabinet to view the customers' trays, as the latter are moved along in front of the cabinet while supported upon a suitable shelf.

A further object is to provide a food display and dispensing apparatus comprising a cabinet having portions of its front and rear walls glazed and inclined inwardly, and a food containing compartment being provided within the cabinet and having its front and top walls spaced from the corresponding walls of the cabinet and also glazed, and means at the front of the cabinet for supporting a tray in a position to be viewed through the glazed wall portions, by an attendant stationed back of the apparatus, and a plate-warming chamber being provided at the back of the cabinet having suitable heating elements arranged therein, whereby plates and other receptacles or dishes placed within the chamber, may be warmed or heated before food is placed therein.

Other objects of the invention reside in the novel construction of the food-containing compartment within the cabinet; the means provided for establishing air circulation within the entire interior of the cabinet and around the food-containing compartment; the means provided for illuminating the food compartment and in the arrangement and construction of the upper wall portions of the cabinet and food compartment, whereby customers may conveniently view the articles of food contained in the compartment and, at the same time, the attendant back of the apparatus, may view the customers' trays, for the purpose of suggesting food articles to the prospective customers; the particular arrangement of the door provided in the rear inclined wall of the upper portion of the cabinet, which is so constructed that it may conveniently be operated by the attendant without loss of time; in the hinged construction of the glazed wall portions of the cabinet walls, whereby access may be had to the exterior of the front and top walls of the food-containing compartment for cleaning and other purposes; and, in the means provided in the lower portion of the cabinet for increasing circulation in the cabinet and around the food compartment.

Other objects of the invention will appear from the following description and accompanying drawings and will be pointed out in the annexed claims.

Features of the invention reside in the arrangement of the spaced walls of the apparatus, whereby the walls defining the food-containing chamber will be uniformly heated on all sides, thereby preventing moisture from accumulating upon the glazed walls and obstructing vision; in the arrangement of the rear foldable door which, when open, may be used as a work shelf or carving board for the operator; in the arrangement of the air-circulation passages whereby heated air is circulated around the food display and dispensing chamber so that the walls at the top of the chamber will be as hot as the bottom wall thereof; and, whereby the foods will be kept hot in their own moisture contents and their flavor retained; in the arrangement of the bottom wall of the food chamber which is so constructed that when the rear foldable door is opened, the bottom wall may readily be removed and access had to the heating elements arranged in the bottom of the cabinet; and, in the general construction and arrangement of the glazed walls whereby the operator may look through the glass above the rear door opening and directly through the plate glass walls at the front of the cabinet and see the customer's tray, supported upon the shelf at the front side of the counter.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 1 is a vertical sectional view of the improved apparatus, showing the general arrangement of the parts, the dotted lines at the left hand side of the figure indicating the position of the door when open, and the dotted lines at the upper portion of the figure indicating open positions of the front and rear glazed wall portions of the cabinet;

Figure 4 is a detailed sectional view on the line 4—4 of Figure 1.

Figure 2:
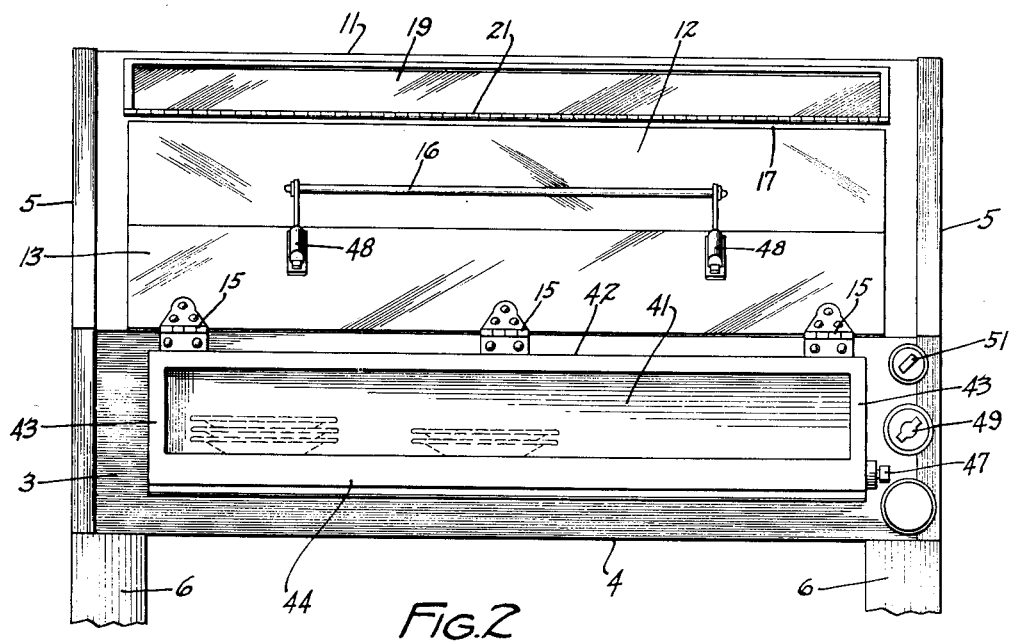
Figure 2 is a rear elevation of the upper portion of the apparatus, showing plates positioned in the plate-warming chamber.

The novel food display and dispensing apparatus featured in this invention comprises a cabinet having front, rear, and bottom walls 2, 3, and 4, respectively, and end walls 5, all of suitable insulating material. The cabinet is supported upon suitable legs 6, shown in Figure 1.

The upper portion 7 of the front wall 2 is glazed and is hinged at 8 to permit swinging movement thereof. The upper edge of the wall portion 7 is adapted to be received in a seat 9, provided in the top wall 11. The upper portion of the rear wall 3 is inclined as shown, and has a door comprising sections 12 and 13 hinged together at 14. The lower section 13 is hinged to the wall 3 at 15, so that the door may be opened to the dotted line position shown in Figure 1. A handle 16 is secured to the door section 13 for the convenience of the operator in opening the door. A fixed rail 17 is provided at the upper edge of the door section 12 and has a seat 18 adapted to receive the upper edge of the door section 12. A glazed wall section 19 is hinged to the rail 17, as indicated at 21, and has its upper edge received in a seat 22 provided at the top wall 11. Suitable lights 23 are mounted on the rail 17 and have reflectors 24 for projecting the light rays downwardly. These reflectors also conceal the lights so that they will not be seen by customers passing in front of the apparatus.

Figure 3:
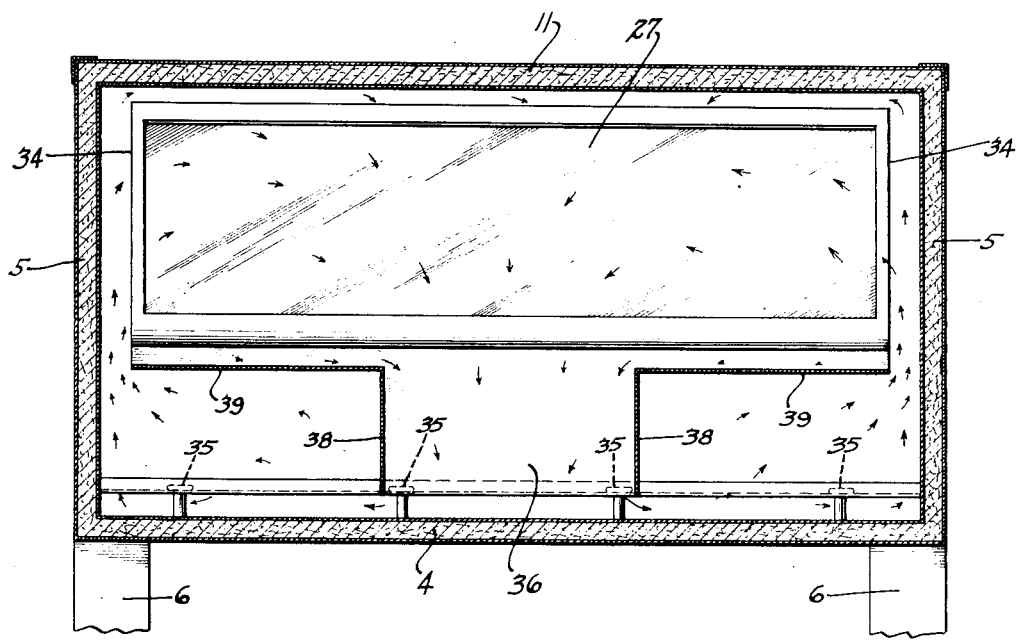
Figure 3 is a vertical sectional view on the line 3—3 of Figure 1, showing the means provided for circulating the heated air around the food-containing compartment.

A food compartment 25 is provided within the upper portion of the cabinet and is defined by the top wall 26, front wall 27, door sections 12 and 13, and removable bottom wall 28; the latter being provided with suitable depressions 29 and 31 for receiving food containers 32 and 33, respectively. Depending elements 30 are also provided on the bottom wall 28 to retain it in proper position. The top and front walls 26 and 27 respectively, of the food compartment are glazed, and are spaced from the corresponding walls of the cabinet as particularly shown in Figure 1. The end walls 34 of the food compartment are also spaced from the end walls 5 of the cabinet as shown in Figure 3. Thus, it will be seen that inter-communicating air circulation passages are provided around the top, bottom, front, and ends of the food compartment. Suitable heaters 35 such, for example, as electric heating elements, are provided in the bottom of the cabinet for heating and circulating the air around the food compartment. Access may be had to the heaters 35 by removal of the bottom wall 28.

To assure uniform circulation of the heated air in all of the air passages around the food compartment, a return air flue 36 is provided adjacent the front wall portion 2 of the cabinet. This return air flue communicates with the air passages at the front, top and ends of the food compartment. The return air flue 36 is defined by the walls 37 and 38, preferably of sheet metal, and the front wall portion 2 of the cabinet, as shown in Figures 2, 3, and 4. The lower edges of the walls 37 and 38 are spaced from the bottom wall 4 of the cabinet to permit circulation of air therebeneath, as indicated by the arrows in Figures 1 and 3. Deflecting walls 39 extend from the end walls 38 of the return air flue 36 to the ends of the food compartment, as particularly shown in Figure 3, thereby causing the heat rising from the heating elements 35 to be directed to the air circulation passages at the ends of the food compartment, thence upwardly and over the top and front walls of the food compartment, returning to the bottom of the cabinet through the air flue 36, as indicated by the arrows in Figure 3. The heating elements 35 are preferably arranged as indicated in Figure 3, so that complete circulation of the heated air through the air circulation passages around the compartment is established.

Another feature of this invention resides in the means provided at the rear of the apparatus for warming or heating plates or other dishes before placing food therein by the attendant. This plate-warming device is shown in Figures 1 and 2, and comprises an elongated open chamber 41, defined by an upper wall 42, end walls 43, the rear wall portion 3 of the cabinet, and a bottom wall 44, preferably of insulating material. A suitable false bottom 45 is provided within the chamber 41, spaced from the insulating wall 44, and between this bottom and the bottom 44, suitable heating elements 46 are arranged, which preferably are of the electric type, and whose operation may be controlled by means of a suitable switch 47, shown in Figure 2. The false bottom 45 is preferably inclined downwardly, towards the back of the chamber 41, so that plates and other receptacles may be supported thereon without danger of accidentally falling off. The plate warming chamber extends substantially the full length of the apparatus, as shown in Figure 2, and it will also be noted by reference to this figure, that the door at the rear of the food compartment also extends substantially the full length of the compartment.

The top wall 42 of the plate-warming chamber also provides a support for the door sections 12 and 13, when the door is in open position, as indicated by the dotted lines in Figure 1. Rubber bumpers or cushions 48 are preferably secured to the lower door section 13 adapted to engage the upper wall 42 of the compartment when the door is open.

In the accompanying drawings, I have indicated the apparatus as being electrically operated, that is, electric heating elements are employed for heating and circulating the air within the cabinet and around the food compartment, and when such heating elements are used, a suitable switch 49 is preferably provided at the rear of the cabinet for conveniently controlling the operation of the heating elements. A switch 51 is also provided for turning on and off the lights 23. It is to be understood, however, that other types of heating means may be used if desired, without departing from the scope of the invention.

An important feature of this invention resides in the particular arrangement of the glazed wall portions 7 and 19 of the cabinet walls, and the glazed wall portions 26 and 27 of the food compartment. These wall portions, it will be noted, by reference to Figure 1, are angularly disposed with reference to the vertical, and are so arranged that an attendant standing back of the apparatus may look through the glazed wall portions and view the customer's tray 52, movably supported upon a suitable shelf 53 secured to the lower front wall portion 2, as indicated in Figure 1. The broken line A indicates the line of vision of the attendant, when viewing the customer's tray. The front glazed wall portions 7 and 27 are arranged at an angle to permit the customer to readily view the food articles displayed within the compartment 25.

I have found that the angular arrangement and alinement of the glazed wall portions 7, 19, 26, and 27 with one another, is very desirable, because it permits the attendant back of the apparatus to readily view the customers' trays, without having to look over the top of the cabinet, which would be necessary if these wall portions were not arranged and glazed in the particular manner shown. The hinged mountings of the wall portion 7 and 19 also permit convenient access to the front and top walls 27 and 26, respectively, of the food compartment, so that the latter may be conveniently cleaned when necessary without having to dismantle any part of the apparatus.

I claim as my invention:

1. An apparatus of the class described, comprising a cabinet having a food display compartment therein provided with top, front, end, and bottom walls, spaced from the corresponding walls of said cabinet, a heater beneath the compartment, the cabinet having a plate-warming chamber provided at the rear thereof, and a folding door in the rear inclined wall of the cabinet adapted to fold upon itself and to be supported upon the top wall of said plate-warming chamber, when in open position, thereby providing means for supporting plates and other food containers while food is being placed therein by an attendant stationed back of the cabinet.

2. An apparatus of the class described, comprising a cabinet having inclined front and rear wall portions, and having a food display compartment therein provided with top, front, end and bottom walls, spaced from the corresponding walls of said cabinet, a heater in the cabinet beneath said compartment, said cabinet having a plate-warming chamber at the rear thereof, a folding door in the rear inclined wall of the cabinet above the warming chamber adapted to fold upon itself and to be supported upon the upper wall of said plate-warming chamber, when in open position, whereby said door may be utilized as a shelf for temporarily supporting plates and other food containers, and independent heating means in the warming chamber.

3. An apparatus of the class described, comprising a cabinet having portions of its front and rear walls glazed, and having a food display compartment therein provided with glazed front and top walls, spaced from the corresponding walls of said cabinet, and a supporting member located at the front of the cabinet adapted to support a tray for a customer, while receiving food articles, said supporting member being arranged so that an attendant back of the cabinet may view food articles on the customer's tray, through said glazed walls.

4. An apparatus of the class described, comprising a cabinet having portions of its front and rear walls glazed and inclined inwardly, said cabinet having a food display compartment therein provided with glazed front and top walls, and a supporting member located at the front of the cabinet adapted to support a tray for a customer, while receiving food articles, said supporting member being arranged so that an attendant back of the cabinet may view food articles on the customer's tray, through said glazed walls.

5. An apparatus of the class described, comprising a cabinet having a food display compartment therein and a plate-warming chamber at its rear, and a folding door in the rear wall of the cabinet through which access may be had to the food compartment, said door being arranged to fold upon itself and be supported upon the top wall of said plate-warming chamber.

6. An apparatus of the class described, comprising a cabinet the opposite walls of which are provided with glazed portions said cabinet having a food display compartment therein, the end, top, and front walls of which are spaced from the corresponding walls of the cabinet to provide air circulation passages, and the top and front walls comprising transparent panels alined with the glazed portions of the cabinet walls, said cabinet also having a heating chamber located beneath the food compartment and provided with a suitable heating means, and an air flue mounted in said heating chamber and having its lower end spaced from the bottom wall of said chamber and having its opposite end connected with the air circulation passages provided at the front, ends, and top of the food compartment whereby heated air may be circulated through the air passages between said glazed wall portions and said transparent panels to heat said transparent panels sufficiently to prevent the condensation of steam and vapor thereon, and whereby a clear vision may be had through said glazed wall portions and said panels.

7. A food display and dispensing apparatus, comprising a cabinet having insulating walls, two of which are provided with glazed portions, transparent panels situated within the cabinet and spaced from said wall portions whereby air circulation passages are provided therebetween, a member horizontally disposed within the cabinet and cooperating with said transparent panels and a wall of the cabinet to define a food display chamber, said member also cooperating with the lower portions of the cabinet walls to provide a heating chamber, means in said chamber adapted to cause a circulation of heated air through said air circulation passages whereby said transparent panels will be maintained at a temperature to prevent the condensation of steam or vapor thereon, when hot foods are placed in the food display chamber, and whereby a clear vision may be had through said alined glazed wall portions and said transparent panels to permit a prospective purchaser to readily view food displayed in the food chamber.

8. In a food display and dispensing apparatus, comprising a cabinet having insulated walls, the upper portion of the front wall of the cabinet being inclined inwardly and provided with a glazed panel, transparent panels situated within the cabinet and one of said panels being arranged in spaced-parallel relation to said glazed wall portion, a transparent panel connected with the upper edge of said first mentioned transparent panel and having its opposite edge connected with the rear inclined wall of the cabinet, said rear wall also having a glazed portion alined with said transparent panels and the glazed wall portion of the front wall of the cabinet, whereby an attendant stationed back of the apparatus may view a customer's tray placed in front of the cabinet, said transparent panels having end walls secured thereto and spaced from the corresponding walls of the cabinet and cooperating with a member horizontally disposed within the cabinet to define a food display chamber having air circulation passages partially encircling it, said cabinet having a heating chamber therein beneath said food display chamber provided with means for heating the air therein whereby a circulation of heated air may be established through said air circulation passages to maintain the transparent panels of the food display chamber at a temperature which will prevent the condensation of steam or vapor thereon, when hot foods are placed within the food display chamber, and a door at the rear of the cabinet whereby access may be had to the interior of the food display chamber.

9. A food display and dispensing apparatus, comprising an insulated bottom and end walls, the lower portion of the front and back walls of the cabinet being substantially vertically disposed and also insulated, the upper portions of the front wall being inclined inwardly and provided with a glazed panel, and the upper portion of the rear wall being also inclined inwardly, ledges within the cabinet adapted to support a member provided with means for receiving and supporting cooking utensils containing food, said member dividing the interior of the cabinet into two chambers, one adapted for the storage of food and the other adapted to receive a suitable heating means whereby it may function as a heating chamber to keep the food hot, a transparent panel arranged in spaced relation to the glazed panel provided in the upper front wall portion of the cabinet, a relatively smaller transparent panel having an edge connected with said first mentioned transparent panel and having its opposite edge supported upon the upper rear wall portion of the cabinet, said relatively smaller panel being spaced from the top wall of the cabinet to provide an air-circulation passage therebetween and cooperating with said rear transparent panel and said horizontally disposed member and said inclined rear wall portion of the cabinet to define a food display chamber, and means in said heating chamber adapted to cause a circulation of heated air through said air passages.

10. A food display and dispensing apparatus, comprising an insulated bottom and end walls, the lower portions of the front and back walls of the cabinet being substantially vertically disposed and also insulated, the upper portions of the front wall being inclined inwardly and provided with a glazed panel and the upper portion of the rear wall being also inclined inwardly, ledges within the cabinet adapted to support a member provided with means for receiving and supporting cooking utensils containing food, said member dividing the interior of the cabinet into two chambers, one adapted for the storage of food and the other adapted to receive a suitable heating means whereby it may function as a heating chamber to keep the food hot, a transparent panel arranged in spaced relation to the glazed panel provided in the upper front wall portion of the cabinet, a relatively smaller transparent panel having an edge connected with the upper edge of said first mentioned transparent panel and having its opposite edge supported upon the upper rear wall portion of the cabinet, said relatively smaller panel being spaced from the top wall of the cabinet to provide an air-circulation passage therebetween and cooperating with said rear transparent panel and said horizontally disposed member and said inclined rear wall portion of the cabinet to define a food display chamber, means in said heating chamber adapted to cause a circulation of heated air through said air passages, and said cabinet having a plate warming chamber at the rear thereof provided with an independent heating means.

In witness whereof, I have hereunto set my hand this 14th day of May, 1928.

JOHN H. JOHNSON.